United States Patent
Kubik et al.

(10) Patent No.: US 6,519,633 B1
(45) Date of Patent: Feb. 11, 2003

(54) INSTALLABLE FILE SYSTEM FOR CLIENT IN A COMPUTER NETWORK

(75) Inventors: Joseph Kubik, Austin, TX (US); Michael Joseph Sullivan, Austin, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/321,790

(22) Filed: May 27, 1999

(51) Int. Cl.[7] .......................................... G06F 15/177
(52) U.S. Cl. ........................ 709/220; 707/1; 707/10
(58) Field of Search ................................ 709/300, 220, 709/222; 707/1, 10; 703/22, 23

(56) References Cited

U.S. PATENT DOCUMENTS

| | | | |
|---|---|---|---|
| 5,555,416 A | | 9/1996 | Owens et al. ............... 395/700 |
| 5,689,701 A | | 11/1997 | Ault et al. ................... 395/610 |
| 5,706,502 A | | 1/1998 | Foley et al. ................. 395/610 |
| 5,752,005 A | * | 5/1998 | Jones .......................... 703/22 |
| 5,926,631 A | * | 7/1999 | McGarvey ................... 709/200 |
| 6,269,371 B1 | * | 7/2001 | Ohnishi ........................ 707/1 |

OTHER PUBLICATIONS

Gamma et al. "Elements of Object–Oriented Software Design", Addison–Wesley, 1995. (pp. 87–95).*

"JavaSoft announces JavaOS", May 29, 1996.*

* cited by examiner

Primary Examiner—Zarni Maung
(74) Attorney, Agent, or Firm—David A. Mims, Jr.; Bracewell & Patterson, L.L.P.

(57) ABSTRACT

A client station on computer network uses an operating system such as JavaOS which is permanently stored at the server rather than on storage media at the client location. The JavaOS is loaded and installed at the client upon bootup of the client. The client loads certain standard file systems as part of the basic OS code that it receives from the server. These employ a generic file system driver, which is located in Java code rather than in native code at the client. In addition to the standard file systems, other file systems may be installed, using this generic file system driver. For example, a file system for a hard drive may be installed at a particular client, even though this file system is not part of the set of standard file systems. Providing the generic file system driver or handler switch in Java code rather than native code allows file systems to be dynamically added to a running system.

6 Claims, 4 Drawing Sheets

| File System | Prefix | Initialization |
|---|---|---|
| ROM | /ROM | static |
| System (Java Service Loader) | /SYSTEM | static |
| NFS | /HOME (or no prefix) | dynamic ifs |
| TFTP | /FONTS | dynamic ifs |

Fig. 2

INSTALLABLE FILE SYSTEM FOR CLIENT IN A COMPUTER NETWORK

BACKGROUND OF THE INVENTION

1. Technical Field

This invention relates to computer systems and networks, and more particularly to installable file systems in client operating system loaded from a server on a network such as the internet.

2. Description of the Related Art

A client computer on a network may in some instances be in the form of a minimally-configured platform having only the basic components needed to input and output data by a user. All of the applications software and long-term storage of data is provided by a server somewhere else on the network. This type of client station is sometimes called a network computer, in that it is operable only when connected to the network rather than as a stand-alone unit. The client station often does not have permanent storage media such as a hard disk drive or a CD-ROM drive, but instead merely accesses any needed programs and data from a remote server via the network.

In addition to relying on the server and the network for applications programs and for long-term data storage, the client station may also rely on the network link for its operating system. JavaOS™ is an example of such an arrangement. JavaOS is an operating system maintained at a server on a network for downloading by a client each time the client comes online at bootup. The client station contains in its hardware a minimumally-sufficient ROM-based code to log onto the network at power-on and begin to retrieve information from the server; this client immediately starts installing its operating system into local memory upon boot-up as the code is received from the server. Then, after the operating system software is installed, the applications programs needed are retrieved from the server and installed in system memory.

The client station using a JavaOS server-provided operating system or the like has ROM-based code to start loading its operating system from the server, such as by TFTP, at start-up. The JavaOS operating system loads a set of standard file systems, such as those for NFS and TFTP. In some situations, however, it would be preferable to have additional file systems at particular clients. For example, a client may have a hard disk or other permanent store, and thus need a file system or driver for accessing this media. It would not be desirable to add file systems or drivers to the OS package of code that is loaded over the network to all of the clients as they boot up, because this would unduly burden the network, and also would occupy memory at each of the clients. Accordingly, the absence of installable file systems in JavaOS results in limitations on utility, or otherwise unnecessary network traffic is generated and memory usage is inefficient.

SUMMARY OF THE INVENTION

It is therefore one object of the present invention to provide an improved method of operating a client in a computer network system in a more efficient manner.

It is another object of the present invention to provide an improved method of operating a server-provided operating system at a client in a computer network, particularly an improved file system.

It is yet another object of the present invention to provide an improved file system for a client operating system in a computer network.

The above as well as additional objects, features, and advantages of the present invention will become apparent in the following detailed written description.

According to one embodiment of the invention, a client station on computer network uses an operating system such as JavaOS which is permanently stored at the server rather than on storage media at the client location. The JavaOS is loaded and installed at the client upon bootup of the client. The client loads certain standard file systems as part of the basic OS code that it receives from the server. These employ a generic file system driver, which is located in Java code rather than in native code at the client. In addition to the standard file systems, other file systems may be installed, using this generic file system driver. For example, a file system for a hard drive may be installed at a particular client, even though this file system is not part of the set of standard file systems. Providing the generic file system driver or handler switch in Java code rather than native code allows file systems to be dynamically added to a running system.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment, when read in conjunction with the accompanying drawings, wherein:

FIG. 2 is Table of characteristics of file system used in the system of FIG. 1, according to one embodiment of the invention;

DETAILED DESCRIPTION OF PREFERRED EMBODIMENT

Figure 1:
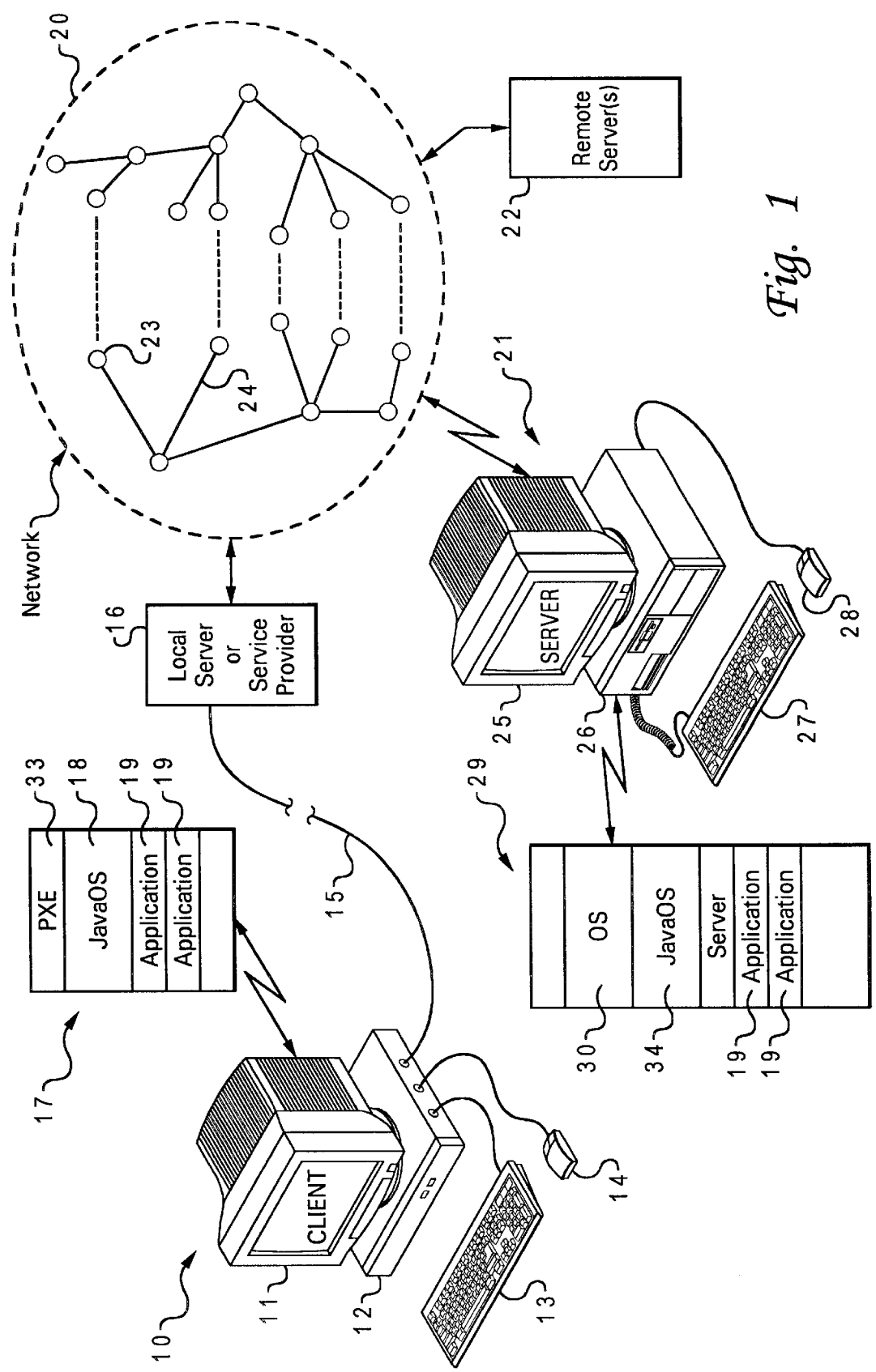
FIG. 1 is an electrical diagram in block form of a computer network which may use features of the present invention.

Referring to FIG. 1, a network system is shown in which concepts of the invention may be used. A client computer station 10 is employed by the user to perform local tasks as well as to obtain information from a network such as the internet. The client station 10 in this case often includes minimal hardware and software, such as a monitor 11, a small system unit 12, a keyboard 13, and a mouse 14. The system unit contains a CPU and system memory, and an adapter card or modem for connection to a network, but often no hard disk or other local persistent storage media. For example, the station 10 may be connected by a modem and a phone line 15, or by a cable, to an internet or intranet server 16 or service provider. The local system memory 17 for the client 10 must contain at least certain classes of an operating system 18, e.g., JavaOS, which was downloaded from a remote server after the client station 10 was booted up. In addition, the memory 17 includes various applications programs 19 for doing the required tasks. For example, the applications programs typically include a wordprocessor, a spreadsheet, as well as perhaps code for accessing the network, such as a TCP/IP stack, an HTTP-compliant web browser such as Netscape Navigator®, an email client which supports simple mail-transfer protocol (SMTP) used for e-mail, for example. These various applications programs 19 are also loaded via the network link from a remote server, as needed, after the station 10 is booted. All of the software including the operating system and applications programs must remain in main memory or RAM at the client because there is usually no hard disk to implement swapping.

The client 10 is part of a network. The interface server 16 or service provider is connected to the internet 20, or network of this type. Thus, the client station 10 is able to send and receive messages to and from other stations on the network 20, and to retrieve information from the network or internet 20, using standard internet connections and applications software.

The internet 20 allows the user at client station 10 to link with other servers and networks such as servers 21 and 22 to retrieve data and programs. The term internet refers to the collection of networks and gateways 23 and 24 that utilize the TCP/IP suite of protocols. TCP/IP is an acronym for "Transport Control Protocol/Interface Program," a software protocol for communication between computers. The internet 20 is a system of geographically distributed computer networks interconnected by computers executing networking protocols allowing users to interact and share information over the networks. The internet has evolved as an "open" system for which developers can design software applications for performing specialized operations or services, essentially without restriction.

The server 21 in this example has a monitor 25, a system unit 26, a keyboard 27, and a mouse 28. The system unit 26 contains a CPU and system memory, and an adapter card or modem for connection to the network 20, and server-level storage such as hard disk drives, CD-ROM, and other persistent storage media, local or remote. The system memory map 29 for the server 21, which in this case represents virtual memory, i.e., physical memory and disk storage, contains an operating system 30 for the server, and a copy of the client operating system, JavaOS, which is to be downloaded from this remote server when the client station 10 is booted up. In addition, the memory 29 includes applications programs used by the server, as well as copies of the applications programs 19 for sending to the client stations. The server software is of course capable of accessing the network, such as by an HTTP-compliant web server as well as function as an email server which supports SMTP.

The client 10 contains code 33 in local memory that is loaded from local ROM upon boot-up, before the operating system 18 is obtained from the server. The code 33 allows the client 10 to operate as a network station at a minimum level so that the operating system and network browser can be downloaded.

Thus, the client station 10 using a JavaOS server-provided operating system 19 or the like has ROM-based code 33 to start loading its operating system from the server 21, using a communication protocol such as TFTP, at start-up. The JavaOS operating system 34 as available at the server for sending to the client.

A part of the JavaOS is the Automounter which provides the capability to mount remote file systems using information contained in Java System Database (JSD) business card entries. There is a set of Business Cards that are available from a server, and when a client boots up it gathers this list of business cards; what each business card represents is a set of services that this client machine is able to load if it determines they are needed. If a client loaded a business card that identified a service (needed by one of the client's applications) which is retrieved using a certain file system driver, like one of the drivers 48–50 as will be described below in reference to FIG. 3, what it would do first load the certain file system driver which would be plugged in like drivers 48–50 and then it would use that to get the files that the application needed. The Automount does this mounting of remote file systems by defining a consistent set of configuration and runtime services. The framework that comprises the Automounter framework is called the Generic File System 47. Installable file systems, such as NFS and TFTP, register their services with the Generic File System framework 47 during the creation of each mount point. The Automount framework replaces the functionality provided by the -djavaos.homedir and -djavaos.mountlst parameters previously provided by DHCP.

The Generic File System component 47 provides Java applications and JavaOS system components access to local and remote file systems. File systems can be dynamically added to the system, or may be part of the static boot image. Files are opened on a particular file system by supplying a prefix on the file name. For example, the following code snippet opens a file in the /SYSTEM file system:

java.lang.String name="/mydir/myfile ";

java.io.FileOutputStream fos=new FileOutputStream ("/SYSTEM"+name);

This request to open the file is routed to the appropriate file system support code by the Generic File System component. Further requests to access the file are also routed to the correct file system.

The file system routing mechanism is supported by native "C" code in the kernel. Support for loading and mounting a new file system is provided in Java, so that new file systems may be added without recompiling the kernel. The following code is an example of mounting a new file system:

```
try {
    new GenericFileSystem("sun.javaos.net.TftpFileSystem",
                                this, "dynamic", prefix);
} catch (Exception e) {
    System.err.println("TftpFileSystem: failed to instantiate GFS");
```

The class specified as supporting the new file system ("sun.javaos.net.TftpFileSystem" in the above example) must implement a set of well known methods in order for the Generic File System to route requests. These methods are described in the following paragraphs.

The table of FIG. 2 lists the available file systems, their selection prefix (mount point), and initialization time. Other mount points may be added by business cards for the installable file systems. A sample may be provided for the FONTS and REMOTE mount points.

Figure 3:
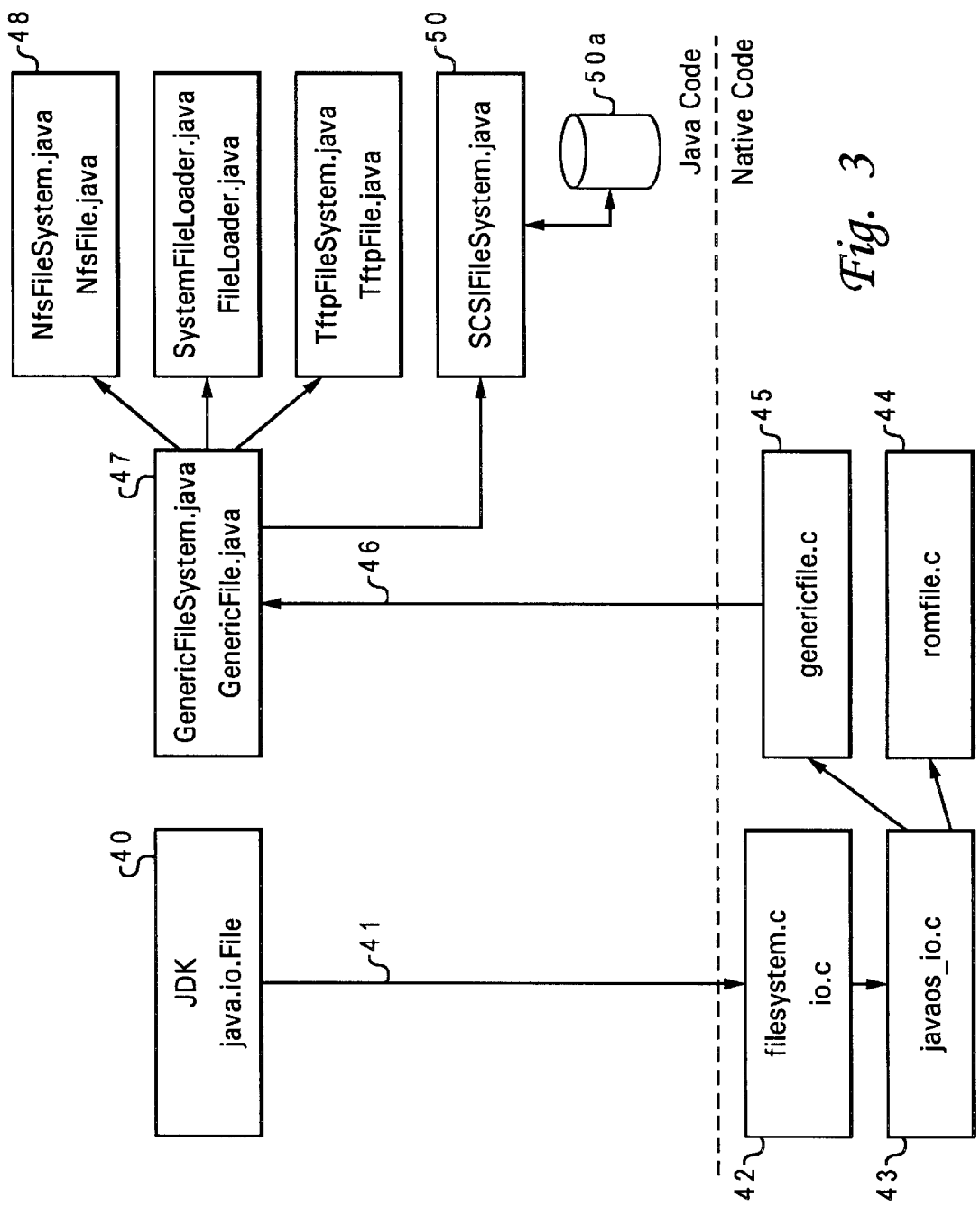
FIG. 3 is a diagram of the modules of the generic file system and interaction or flow, in the system of FIG. 1.

The diagram of FIG. 3 illustrates the modules of the generic file system and their interaction. The arrows in FIG. 3 indicate the general flow of control during access to a file or file system. The java.io.File 40, java.io.FileInputStream, and java.io.FileOutput Stream API in the JDK (in Java code) call via line 41 native methods 42 such as filesystem.c or io.c in native code to route file access requests to the kernel. The java_io.c module 43 parses the prefix and routes the requests either to the internal ROM file system 44, or to the generic file module 45. The request is then routed via line 46 to the GenericFileSystem or GenericFile class, block 47, which forwards it on the appropriate file system handler, e.g., NFS 48, or TFTP 49. Providing the file system handler switch in the Generic File System allows file systems to be dynamically added to a running system. For example, a file system 50 may be created to access a SCSI drive 50a for a particular platform. This file system and drive may not be needed in most cases, but for a particular platform it may be desirable to set of a driver (file system) for a hard drive.

Figure 4:
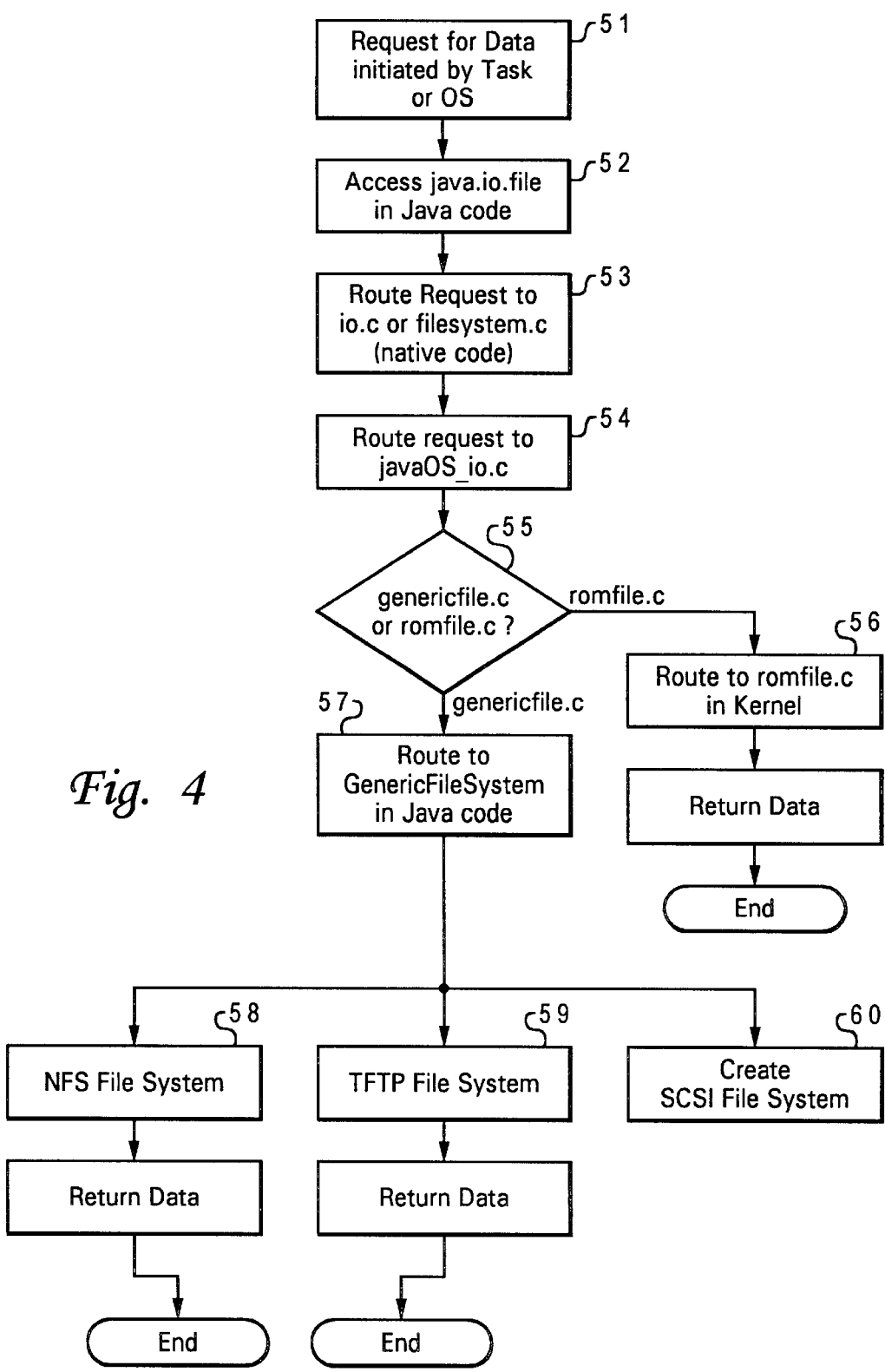
FIG. 4 is a flow chart of the method of accessing file systems in the system of FIGS. 1–3.

Referring to FIG. 4 a flow chart of the method of accessing file system data in the system of FIGS. 1–3 is illustrated, in particular using the modules of the generic file system of FIG. 3. During access to a file or file system, a request is made by a task or the OS, as indicated by block 51. This request goes to the java.io.File module 40 which is in Java code, indicated by block 52. The java.io.File module 40 passes the request to the filesystem.c and io.c, which is in native code, i.e., the kernel, whether it is a file or an I/O request, indicated by block 53. The filesystem.c or io.c in native code routes the file access requests to the kernel, block 53. The java_io.c module 43 parses the prefix and routes the requests either to the internal ROM file system 44, or to the generic file module 45, as indicated by block 54. The request is then routed as indicated by blocks 55, 56 and 57 to either the romfile.c 44 in the kernel or to GenericFileSystem or GenericFile class 47 in Java code. The GenericFileSystem.java in Java code then forwards the request on to the appropriate file system handler NFS 48, or TFTP 49 as indicated by blocks 58, or 59. Providing the file system handler switch in Java code rather than native code allows file systems to be dynamically added to a running system, such as the SCSI FileSystem 50 mentioned above, as illustrated by block 60.

Static file systems such as ROM and SYSTEM of FIG. 2 are created during the kernel initialization and cannot be terminated. Dynamic file systems NFS and TFTP 48 and 49, and the SCSIFileSystem 50, are created, and terminated, by code running in the JVM (Java virtual machine). Note that the Generic File System 47 only provides routing of file system requests. All implementation (including file locking) is the responsibility of each file system.

An instance of each installable files system (such as NFS or TFTP) is created by the Java Service Loader (JSL) for each mount business card entry present in the JSD. The business card entry contains the IFS specific information required to perform the mount. Once the instance of the IFS has attached to the remote server 21, the IFS registers the mount with the Generic File System, enabling JDK file operations to the mount point. Example NFS business card information:

bundleInstanceInfo=HomeDirectory,
  sun.javaos.NfsFileSystem.NfsFileSystem
loadsWhenDiscovered=true
mount_path=servername:/directory
mount_name=/HOME
protocol_type=UDP
mount_early=true
isBusinessCard=true Certain public methods/APIs are of interest. Interfaces are exported to the JDK. The APIs listed in Table I are exported for use by the native "C" code. Entry points are exported from the file javaos_io.c 43 through the header sys_api.h. The API is similar to a standard "C" run-time library file access API.

While the invention has been shown and described with reference to a particular embodiment, it will be understood that various changes in form and detail of the preferred embodiment, as well as other embodiments of the invention, may be made by those skilled in the art without departing from the true spirit and scope of the invention.

TABLE I int sysAccess(const char* pFile, int perm)
    Determines if file can be accessed. Returns 0 if can access, −1 otherwise.
  int sysStat(const char* path, struct stat *sbuf)
    Gets file status. Returns 0 if can stat the file, −1 otherwise.
  int sysOpen(const char* name, int openMode, int filePerm)
    Opens a file. Returns the file description index if successful, −1 otherwise.
  int sysClose (int fd)
    Closes a file. Returns 0 if closed, −1 otherwise.
  long sysSeek(int fd, long offset, int whence)
    Seeks a file. Returns the new file position or −1 if can't seek.
  int sysAvailable (int fd, long* bytes)
    Returns 1 if *bytes set to the number of bytes available, 0 on error.
  size_t sysRead(int fd, void *buf unsigned int nBytes)
    Reads from a file. Returns the number of bytes read, or −1 on error.
  size_t sysWrite(int fd, const void *buf unsigned int nBytes)
    Writes to a file. Returns the number of bytes written, or −1 on error.
  int sysRename (const char* srcName, const char* dstName)
    Renames a file. File cannpt be renamed across file systems.
    Returns 0 on success, −1 on error.
  int sysUnlink(const char* file)
    Removes file. Returns 0 on success, −1 on error.
  int sysMkdir(const char* path, int mode)
    Makes a directory. Returns 0 on success, −1 on error.
  int sysRmdir(const char* path)
    Removes a directory. Directory must be empty.
    Returns 0 on success, −1 on error.
  DIR* sysOpenDir(const char* path)
    Opens a directory. Returns pointer to DIR struct on success, or NULL if error.
  int sysCloseDir(DIR* dp)
    Closes a directory. Returns 0 on success, −1 on error.
  struct dirent* sysReadDir(DIR* dp)
    Returns directory entry on success, NULL otherwise.
  int mount_fs(char* prefix, pathops *OPS, unsigned fsid)
    Mounts a file system. Returns 0 on success, −1 on error.
    Internal - called be genericfile.c
  int unmount_fs(char* prefix)
    Unmounts a file system. Returns 1 on success, 0 on error.
    Internal - called be genericfile.c
  void init_file_systems( )
    Mounts static file systems.
    Called by javai.c during startup.

What is claimed is:

1. A method of accessing a file in a computer, said computer having a native file system and an installable file system, said method comprising:

parsing a request command for a file to determine if said request is for a file in a native file system or an installable file system;

routing said request command to said native file system if said request command is for a native file in said native file system, wherein said native file system retrieves said native file;

routing said request to a generic file system if said request command is for an installable file on an installable file system persistently registered with said generic file system; and retrieving said installable file from said installable file system.

2. The method of claim 1, wherein if said installable file system has not been created, then said method further comprises:

creating a new installable file system in a Java Virtual Machine;

registering said new installable file system with said generic file system; and retrieving said installable file from said new installable file system.

3. A data processing system comprising:

a native file system;

a generic file system;

an installable file system;

means for parsing a request command for a file to determine if said request is for a file in said native file system or said installable file system;

means for routing said request command to said native file system if said request command is for a native file in said native file system, wherein said native file system retrieves said native file;

means for routing said request to said generic file system if said request command is for an installable file on said installable file system persistently registered with said generic file system; and means for retrieving said installable file from said installable file system.

4. The data processing system of claim 3, wherein if said installable file system has not been created, then said data processing system further comprises:

means for creating a new installable file system in a Java Virtual Machine;

means for registering said new installable file system with said generic file system; and means for retrieving said installable file from said new installable file system.

5. A computer program product, with instructions residing on an instruction bearing medium, for accessing a file in a computer, said computer program product comprising:

instructions within said instruction bearing medium for parsing a request command for a file to determine if said request is for a file in a native file system or an installable file system;

instructions within said instruction bearing medium for routing said request command to said native file system if said request command is for a native file in said native file system, wherein said native file system retrieves said native file;

instructions within said instruction bearing medium for routing said request to a generic file system if said request command is for an installable file on an installable file system persistently registered with said generic file system; and instructions within said instruction bearing medium for retrieving said installable file from said installable file system.

6. The computer program product of claim 5, wherein if said installable file system has not been created, then said computer program product further comprises:

instructions within said instruction bearing medium for creating a new installable file system in a Java Virtual Machine;

instructions within said instruction bearing medium for registering said new installable file system with said generic file system; and instructions within said instruction bearing medium for retrieving said installable file from said new installable file system.

\* \* \* \* \*